(12) United States Patent
Sajjadi et al.

(10) Patent No.: US 12,555,306 B2
(45) Date of Patent: Feb. 17, 2026

(54) GEOMETRY-FREE NEURAL SCENE REPRESENTATIONS THROUGH NOVEL-VIEW SYNTHESIS

(71) Applicant: Google LLC, Mountain View, CA (US)

(72) Inventors: Seyed Mohammad Mehdi Sajjadi, Berlin (DE); Henning Meyer, Berlin (DE); Etienne François Régis Pot, Berlin (DE); Urs Michael Bergmann, Berlin (DE); Klaus Greff, Berlin (DE); Noha Radwan, Zurich (CH); Suhani Deepak-Ranu Vora, San Mateo, CA (US); Mario Lučić, Zurich (CH); Daniel Christopher Duckworth, Berlin (DE); Thomas Allen Funkhouser, Menlo Park, CA (US); Andrea Tagliasacchi, Victoria (CA)

(73) Assignee: GOOGLE LLC, Mountain View, CA (US)

( * ) Notice: Subject to any disclaimer, the term of this patent is extended or adjusted under 35 U.S.C. 154(b) by 484 days.

(21) Appl. No.: 18/013,983

(22) PCT Filed: Nov. 15, 2022

(86) PCT No.: PCT/US2022/049956
§ 371 (c)(1),
(2) Date: Dec. 30, 2022

(87) PCT Pub. No.: WO2023/091408
PCT Pub. Date: May 25, 2023

(65) Prior Publication Data
US 2024/0096001 A1 Mar. 21, 2024

Related U.S. Application Data

(60) Provisional application No. 63/343,882, filed on May 19, 2022, provisional application No. 63/279,875, filed on Nov. 16, 2021.

(51) Int. Cl.
*G06T 15/20* (2011.01)
*G06T 15/06* (2011.01)

(52) U.S. Cl.
CPC .............. *G06T 15/20* (2013.01); *G06T 15/06* (2013.01)

(58) Field of Classification Search
CPC ......... G06T 15/20; G06T 15/06; G06N 3/088; G06N 3/0464; G06N 3/084; G06N 3/0455
See application file for complete search history.

(56) References Cited

U.S. PATENT DOCUMENTS

| 2020/0094405 | A1* | 3/2020 | Davidson | ............... B25J 9/1669 |
| 2023/0137403 | A1* | 5/2023 | Gallo | .................... G06V 40/20 348/47 |

(Continued)

OTHER PUBLICATIONS

International Preliminary Report on Patentability for Application No. PCT/US2022/049956, mailed May 30, 2024, 10 pages.

(Continued)

*Primary Examiner* — Said Broome
*Assistant Examiner* — Andrew Shin
(74) *Attorney, Agent, or Firm* — DORITY & MANNING, P.A.

(57) ABSTRACT

Provided are machine learning models that generate geometry-free neural scene representations through efficient object-centric novel-view synthesis. In particular, one example aspect of the present disclosure provides a novel framework in which an encoder model (e.g., an encoder transformer network) processes one or more RGB images (with or without pose) to produce a fully latent scene representation that can be passed to a decoder model (e.g., a decoder transformer network). Given one or more target poses, the decoder model can synthesize images in a single forward pass. In some example implementations, because (Continued)

transformers are used rather than convolutional or MLP networks, the encoder can learn an attention model that extracts enough 3D information about a scene from a small set of images to render novel views with correct projections, parallax, occlusions, and even semantics, without explicit geometry.

19 Claims, 12 Drawing Sheets

(56) References Cited

U.S. PATENT DOCUMENTS

2024/0212334 A1* 6/2024 Piao .................. G06V 10/82
2024/0233441 A1* 7/2024 Wang .................. G06T 7/70

OTHER PUBLICATIONS

Dosovitskiy et al., "An Image is Worth 16×16 Words: Transformers for Image Recognition at Scale", arXiv:2010.11929v2, Jun. 3, 2021, 22 pages.

Esser et al., "Taming Transformers for High-Resolution Image Synthesis", arxiv.org, Cornell University Library, Jun. 23, 2021, XP081977896.

Mildenhall et al., "NeRF: Representing Scenes as Neural Radiance Fields for View Synthesis", arXiv:2003.08934v2, Aug. 3, 2020, 25 pages.

International Search Report and Written Opinion for Application No. PCT/US2022/049956, mailed on Apr. 6, 2023, 15 pages.

Nguyen-Ha et al., "Sequential View Synthesis with Transformer", Lecture Notes in Computer Science: 15$^{th}$ Asian Conference on Computer Vision, Kyoto Japan, Nov. 30-Dec. 4, 2020, Revised Selected Papers, Part IV, Nov. 30, 2020, Springer International Publishing, vol. 12625, pp. 695-711, https://link.springer.com/content/pdf/10.1007/978-3-030-69538-5_42.pdf>, XP055964200.

Ramirez et al., "Unsupervised Novel View Synthesis from a Single Image", arXiv:2102.03285v2, Dec. 15, 2021, 14 pages.

Rombach et al., "Geometry-Free View Synthesis: Transformers and no 3D Priors", 2021 IEEE/CVF International Conference on Computer Vision, Oct. 10, 2021, pp. 14336-14346, XP034092789.

Schwarz et al., "GRAF: Generative Radiance Fields for 3D-Aware Image Synthesis", arXiv:2007.02442v4, Mar. 30, 2021, 13 pages.

Sitzman et al., "Light Field Networks: Neural Scene Representations with Single-Evaluation Rendering", arXiv:2106.02634v2, Jan. 18, 2022, 20 pages.

Trevithick et al., "GRF: Learning a General Radiance Field for 3D Representation and Rendering", arXiv:2010.04595v3, Aug. 11, 2021, 20 pages.

Wang et al., "IBRNet: Learning Multi-View Image-Based Rendering", arXiv:2102.13090v2, 15 pages.

Yu et al., "pixelNeRF: Neural Radiance Fields from One or Few Images", arXiv:2012.02190v3, May 30, 2021, 20 pages.

* cited by examiner

GEOMETRY-FREE NEURAL SCENE REPRESENTATIONS THROUGH NOVEL-VIEW SYNTHESIS

PRIORITY CLAIM

This application is based upon and claims the right of priority under 35 U.S.C. § 371 to International Application No. PCT/US2022/049956 filed on Nov. 15, 2022, which is based upon and claims the benefit of U.S. Provisional Patent Application No. 63/279,875, having a filing date of Nov. 16, 2021, and U.S. Provisional Patent Application No. 63/343,882, having a filing date of May 19, 2022. Applicant claims priority to and the benefit of each of such applications and incorporate all such applications herein by reference in its entirety.

FIELD

The present disclosure relates generally to machine learning. More particularly, the present disclosure relates to training of machine learning models to generate geometry-free neural scene representations through novel-view synthesis.

BACKGROUND

A classical problem in computer vision is to infer a three-dimensional (3D) scene representation from one or more images (e.g., so that the scene representation can be used to render novel views at interactive rates). Previous methods have either reconstructed explicit 3D representations (e.g. textured meshes) or implicit representations (e.g. radiance fields). However, they generally require input images with precise camera poses and long processing times for each novel scene.

Traditional methods have built explicit 3D representations, such as colored point clouds, meshes, voxels, octrees, and multi-plane images. Although efficient for interactive rendering, they usually require expensive and fragile reconstruction processes and produce discrete representations with limited resolution.

More recent work has investigated representing scenes with purely implicit representations. For example, Neural Radiance Fields (NeRF) trains a multi-layer perceptron (MLP) that produces a density and outgoing RGB radiance for any 5D ray from which novel views can be synthesized with volumetric rendering. However, NeRFs require very expensive training and rendering procedures, as they are learned independently for every scene and require many MLP evaluations for volume rendering of each ray.

Light Field Networks (LFN) train an MLP to produce RGB radiances for 4D ray inputs and use a meta-learning framework to learn a prior over scene representations by training on a database of examples. However, LFN requires precise camera poses and an expensive auto-decoder optimization process for each new scene. It has been demonstrated only for synthetic images of stand-alone ShapeNet objects.

In particular, the development of an object-centric, geometric understanding of the world is considered a cornerstone of human cognition. Replicating these capabilities in machine learning models has been a major focus in computer vision and related fields. However, the conventional paradigm of supervised learning poses several challenges. For example, explicit supervision requires carefully annotated data at a large scale, and is subject to obstacles such as rare or novel object categories. Further, obtaining accurate ground-truth 3D scene and object geometry is prohibitively challenging. As such, an efficient method to implement machine-learning models for object-centric novel view synthesis is desired.

SUMMARY

Aspects and advantages of embodiments of the present disclosure will be set forth in part in the following description, or can be learned from the description, or can be learned through practice of the embodiments.

One example aspect is directed to a computer-implemented method to generate novel views of a scene more efficiently. The method includes: obtaining, by a computing system comprising one or more computing devices, one or more input images that depict a scene; generating, by the computing system, one or more image embeddings respectively for the one or more input images; processing, by the computing system, the one or more image embeddings with a machine-learned encoder model to generate a scene embedding that represents the scene; obtaining, by the computing system, ray data descriptive of one or more ray castings for a predicted image of the scene; processing, by the computing system, the scene embedding and the ray data with a machine-learned decoder model to generate synthesized image data for the one or more ray castings for the predicted image of the scene; and providing, by the computing system, the predicted image of the scene as an output.

In some implementations, one or both of the machine-learned encoder model and the machine-learned decoder model comprise a self-attention model.

In some implementations, the machine-learned encoder model and the machine-learned decoder model have been jointly trained using a shared loss function.

In some implementations, at least the machine-learned encoder model has been pre-trained using different images that depict a different scene.

In some implementations, generating, by the computing system, the one or more image embeddings respectively for the one or more input images comprises processing, by the computing system, the one or more input images with a convolutional neural network to respectively generate the one or more image embeddings.

In some implementations, generating, by the computing system, the one or more image embeddings respectively for the one or more input images comprises generating, by the computing system, one or more learned position embeddings for the one or more input images.

In some implementations, the machine-learned decoder model comprises a self-attention model; and processing, by the computing system, the scene embedding and the ray data with the machine-learned decoder model comprises: generating key and value data elements from the scene embedding; generating query data elements from the ray data; and processing, by the computing system, the key, value, and query data elements with the machine-learned decoder model to generate the synthesized image data for the one or more ray castings.

In some implementations, the synthesized image data for each ray casting comprises color data for a pixel of the predicted image that corresponds to the ray casting.

In some implementations, the one or more input images comprises a plurality of input images respectively captured at a plurality of different poses relative to the scene.

In some implementations, the one or more input images comprise unposed images that have an unspecified pose relative to the scene.

In some implementations the method includes: evaluating, by the computing system, a loss function that compares the synthesized image data for the one or more ray castings to ground truth image data for the one or more ray castings; and modifying, by the computing system, one or more values of one or more parameters of the machine-learned decoder model based at least in part on the loss function.

In some implementations the method includes: evaluating, by the computing system, a loss function that compares the synthesized image data for the one or more ray castings to ground truth image data for the one or more ray castings; and modifying, by the computing system, one or more values of one or more parameters of both the machine-learned decoder model and the machine-learned encoder model based at least in part on the loss function.

Another example aspect is directed to a computing system for generating scene-specific predicted imagery more efficiently, the computing system comprising: one or more processors; and one or more non-transitory computer-readable media that collectively store instructions that, when executed by the one or more processors, cause the computing system to perform operations. The operations include: obtaining a scene embedding generated by a machine-learned encoder model from one or more images of a scene, wherein the scene embedding represents the scene; obtaining, by the computing system, ray data descriptive of one or more ray castings for a predicted image of the scene; processing, by the computing system, the scene embedding and the ray data with a machine-learned decoder model to generate synthesized image data for the one or more ray castings for the predicted image of the scene; and providing, by the computing system, the predicted image of the scene as an output.

In some implementations, one or both of the machine-learned encoder model and the machine-learned decoder model comprise a self-attention model.

In some implementations, the machine-learned encoder model and the machine-learned decoder model have been jointly trained using a shared loss function.

In some implementations, at least the machine-learned encoder model has been pre-trained using different images that depict a different scene.

Another example aspect is directed to one or more non-transitory computer-readable media that store instructions that, when executed by a computing system, cause the computing system to perform operations. The operations include: obtaining, by the computing system, one or more input images that depict a scene; generating, by the computing system, one or more image embeddings respectively for the one or more input images; processing, by the computing system, the one or more image embeddings with a machine-learned encoder model to generate a scene embedding that represents the scene; obtaining, by the computing system, ray data descriptive of one or more ray castings for a predicted image of the scene; processing, by the computing system, the scene embedding and the ray data with a machine-learned decoder model to generate synthesized image data for the one or more ray castings for the predicted image of the scene; evaluating, by the computing system, a loss function that compares the synthesized image data for the one or more ray castings to ground truth image data for the one or more ray castings; and modifying, by the computing system, one or more values of one or more parameters of the machine-learned decoder model based at least in part on the loss function.

In some implementations, the operations further comprise modifying, by the computing system, one or more values of one or more parameters of the machine-learned encoder model based at least in part on the loss function.

In some implementations, one or both of the machine-learned encoder model and the machine-learned decoder model comprise a self-attention model.

In some implementations, at least the machine-learned encoder model has been pre-trained using different images that depict a different scene.

Another example aspect of the present disclosure is directed to a computer-implemented method for efficient object-centric novel view synthesis. The method includes obtaining, by a computing system comprising one or more computing devices, a plurality of latent representation encodings for one or more input images representative of a scene that depicts a plurality of objects, wherein the plurality of latent representation encodings correspond to a plurality of portions of the scene, wherein at least a subset of the plurality of portions depict the plurality of objects. The method includes, for each of a plurality of query ray castings respectively associated with a plurality of pixels, processing, by the computing system with a transformer submodel of a machine-learned decoding model, the plurality of latent representation encodings and a respective query ray casting to generate a feature embedding. The method includes processing, by the computing system with a weighting submodel of the machine-learned decoding model, the feature embedding and a fixed ordering of the plurality of latent representation encodings to obtain a weighted average of the plurality of latent representation encodings for the respective query ray casting. The method includes processing, by the computing system with a rendering submodel of the machine-learned decoding model, the respective query ray casting and the weighted average to obtain a color prediction for a respective pixel of the plurality of pixels.

Another example aspect of the present disclosure is directed to a computing system for efficient object-centric novel view synthesis. The computing system includes one or more processors. The computing system includes one or more non-transitory computer-readable media that store instructions that, when executed by the one or more processors, cause the computing system to perform operations. The operations include obtaining a plurality of latent representation encodings for one or more input images representative of a scene that depicts a plurality of objects, wherein the plurality of latent representation encodings correspond to a plurality of portions of the scene, wherein at least a subset of the plurality of portions depict the plurality of objects. The operations include, for each of a plurality of query ray castings respectively associated with a plurality of pixels, processing, with a transformer submodel of a machine-learned decoding model, the plurality of latent representation encodings and a respective query ray casting to generate a feature embedding. The operations include processing, with a weighting submodel of the machine-learned decoding model, the feature embedding and a fixed ordering of the plurality of latent representation encodings to obtain a weighted average of the plurality of latent representation encodings for the respective query ray casting. The operations include processing, with a rendering submodel of the machine-learned decoding model, the respective query ray casting and the weighted average to obtain a color prediction for a respective pixel of the plurality of pixels.

Another example aspect of the present disclosure is directed to one or more non-transitory computer-readable media that store instructions that, when executed by one or more processors, cause the computing system to perform operations. The operations include obtaining a plurality of latent representation encodings for one or more input images representative of a scene that depicts a plurality of objects, wherein the plurality of latent representation encodings correspond to a plurality of portions of the scene, wherein at least a subset of the plurality of portions depict the plurality of objects. The operations include, for each of a plurality of query ray castings respectively associated with a plurality of pixels, processing, with a transformer submodel of a machine-learned decoding model, the plurality of latent representation encodings and a respective query ray casting to generate a feature embedding. The operations include processing, with a weighting submodel of the machine-learned decoding model, the feature embedding and a fixed ordering of the plurality of latent representation encodings to obtain a weighted average of the plurality of latent representation encodings for the respective query ray casting. The operations include processing, with a rendering submodel of the machine-learned decoding model, the respective query ray casting and the weighted average to obtain a color prediction for a respective pixel of the plurality of pixels.

Another example aspect of the present disclosure is directed to a computer-implemented method for efficient object-centric novel view synthesis. The method includes processing, by a computing system comprising one or more computing devices with a machine-learned encoding model, one or more input images to obtain a scene embedding for a scene depicted by the one or more input images, wherein the scene depicts a plurality of objects. The method includes determining, by the computing system with a machine-learned attention model, a plurality of latent representation encodings from the scene embedding, wherein the plurality of latent representation encodings correspond to a plurality of portions of the scene, wherein at least a subset of the plurality of portions depict the plurality of objects. The method includes processing, by the computing system with a transformer submodel of a machine-learned decoding model, the plurality of latent representation encodings and a respective query ray casting to generate a feature embedding. The method includes processing, by the computing system with a weighting submodel of the machine-learned decoding model, the feature embedding and a fixed ordering of the plurality of latent representation encodings to obtain a weighted average of the plurality of latent representation encodings for the respective query ray casting. The method includes processing, by the computing system with a rendering submodel of the machine-learned decoding model, the respective query ray casting and the weighted average to obtain a color prediction for a respective pixel of the plurality of pixels.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
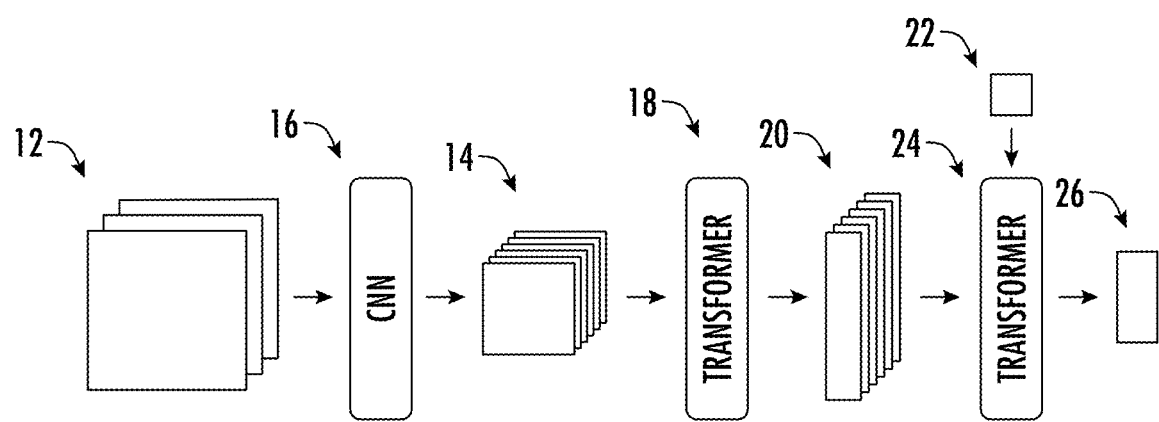
FIG. 1 depicts a block diagram of example machine-learned models according to example embodiments of the present disclosure.

Reference numerals that are repeated across plural figures are intended to identify the same features in various implementations.

DETAILED DESCRIPTION

Overview

Generally, the present disclosure is directed to machine learning models that generate geometry-free neural scene representations through novel-view synthesis. In particular, one example aspect of the present disclosure provides a novel framework in which an encoder model (e.g., an encoder transformer network) processes one or more RGB images (with or without pose) to produce a fully latent scene representation that can be passed to a decoder model (e.g., a decoder transformer network). Given one or more target poses, the decoder model can synthesize images in a single forward pass. In some example implementations, because transformers are used rather than convolutional or MLP networks, the encoder can learn an attention model that extracts enough 3D information about a scene from a small set of images to render novel views with correct projections, parallax, occlusions, and even semantics, without explicit geometry.

More particularly, one example objective of the present disclosure is to synthesize novel images (e.g., RGB images) at interactive rates from one or more input images captured in an environment (e.g., an outdoor environment). This goal is important for virtual exploration of urban spaces such as StreetView, as well as other mapping, visualization, and AR/VR applications. The main challenge is to learn a scene representation that encodes enough 3D information to render novel views with correct parallax and occlusions.

Example approaches provided herein train an encoder transformer that takes in one or more images (optionally with pose) and produces a latent scene representation. The scene representation is input to a decoder transformer along with a camera ray and produces output image data (e.g., an RGB radiance).

The encoder and decoder can be trained jointly on a large database of images. For example, the training images can include sets of images (e.g., tuples of images) where all images in a set (e.g., tuple) observe an overlapping region of the same scene. Once the encoder and decoder are pre-trained, the encoder can be used to produce the latent scene representation from any set of one or more novel images, and the decoder can be used to produce multiple novel images directly from the latent scene representation without further training.

As a result of the above approach, inference for novel views is extremely efficient. This is in contrast to previous approaches which require training a wholly new model for every different scene and/or expensive rendering computations such as integration and sampling over distributions. Thus, the present disclosure enables rendering of synthetic images in a more computationally efficient manner, thereby conserving computational resources such as processor usage, memory usage, and network bandwidth. Conservation of computational resources is a technical effect and benefit and represents an improvement in the computer itself.

One rationale for this approach is to leverage large databases of image collections to learn priors over scene representations. In some implementations, the encoder does not require the precise camera poses for the projection, as it learns an attention model that extracts a 3D scene representation that allows novel view synthesis without explicit 3D-to-2D projections. As a result, it can be trained on massive multi-view image datasets where approximate geo-locations are known, but precise camera poses are not (one example is Street View, but any geotagged image collection or autonomous driving dataset could be used). In particular, in some implementations, no camera pose it necessary at all for rendering novel scenes—the "approximate geo-location" is already implied by the fact that the input images are "nearby" and/or at least partially overlapping.

Moreover, while example implementations are discussed with respect to generation of synthetic RGB imagery, the learned latent scene representation also encodes sufficient information for performing semantic segmentation and other image or scene analysis tasks, even though it was trained only for novel view synthesis.

Furthermore, other aspects of the present disclosure are generally directed to image synthesis. More particularly, these aspects of the present disclosure relates to object-centric, novel view image synthesis. As an example, a computing system can obtain a plurality of latent representation encodings (e.g., "slot" encodings) for one or more input images representative of a scene that depicts a plurality of objects. The plurality of latent representation encodings can correspond to a plurality of portions of the scene. At least a subset of the plurality of portions can depict the plurality of objects. For example, a first latent representation encoding may correspond to a first portion of the image that depicts a first object. A second latent representation encoding may correspond to a second portion of the image that depicts a first half of a second object, and a third latent representation encoding may correspond to a third portion of the image that depicts a second half of the second object. A fourth latent representation encoding may correspond to a fourth portion of the image that does not depict an object.

To synthesize a novel view rendering of the scene, the computing system can utilize a plurality of query ray castings to determine the color of a respective plurality of pixels. Specifically, for each of the plurality of query ray castings, the computing system can generate a feature embedding by processing the plurality of latent representation encodings and a respective query ray casting with a transformer submodel of a machine-learned decoding model. The computing system can then process the feature embedding and a fixed ordering of the plurality of latent representation encodings (e.g., a matrix descriptive of the fixed ordering) with a weighting submodel of the machine-learned decoding model to obtain a weighted average of the plurality of latent representation encodings for the respective query ray casting. More generally, this weighted average can indicate the relevance of each latent representation encoding to the respective query ray casting.

Once the weighted average is obtained, the weighted average can be processed along the original query ray casting to obtain a color prediction for a respective pixel of the plurality of pixels. This can be performed iteratively for each of the plurality of pixels to collectively form image data representative of the scene from a perspective different than the original perspective of the one or more input images. In such fashion, the machine-learned decoding model can be utilized to determine a predicted color for each pixel in a single "pass", therefore efficiently synthesizing an object-centric novel view of the scene.

Systems and methods of the present disclosure provide a number of technical effects and benefits. As one example technical effect and benefit, conventional novel view synthesis models generally require supervised learning. However, the collection of annotated, three-dimensional image data for this supervised learning is prohibitively difficult. By enabling unsupervised training of machine learned models for object-centric novel view synthesis, embodiments of the present disclosure substantially reduce, or eliminate, the prohibitive costs associated with supervised training.

As another example technical effect and benefit, conventional novel synthesis techniques generally fail to scale with increasing numbers of objects and/or increasing visual complexity. Conventional models decode each object independently, adding a significant multiplicative factor to the already expensive volumetric rendering procedure which generally requires hundreds of decoding steps. As such, the requirement of executing thousands, or more, decoding passes for each rendered pixel requires a prohibitive amount of computational and memory resources. However, machine-learned models of the present disclosure can perform efficient pixel value prediction in a single pass regardless of the number of objects, therefore substantially reducing the computing resources necessary for object-centric novel view synthesis (e.g., memory, power, compute cycles, storage, etc.).

With reference now to the Figures, example embodiments of the present disclosure will be discussed in further detail.

FIG. 1 depicts a block diagram of example machine-learned models according to example embodiments of the present disclosure. In particular, FIG. 1 depicts a block diagram of an approach to generate novel views of a scene more efficiently. The model arrangement in FIG. 1 encodes a collection of images into a set of latent features that form a scene representation. Novel views can be rendered at an interactive rate by attending into the latent representation with rays (e.g., 6D light field rays).

With reference now to FIG. 1, a computing system can obtain one or more input images 12 that depict a scene. In some implementations, the one or more input images 12 can be a plurality of input images respectively captured at a plurality of different poses relative to the scene. In some implementations, one or more of the input images 12 are unposed images that have an unspecified pose relative to the scene.

The computing system can generate one or more image embeddings 14 respectively for the one or more input images 12. In some implementations, generating, by the computing system, the one or more image embeddings 14 respectively for the one or more input images 12 can include processing, by the computing system, the one or more input images 12 with a convolutional neural network 16 to respectively generate the one or more image embeddings 14.

In some implementations, generating, by the computing system, the one or more image embeddings 14 respectively for the one or more input images 12 can include generating, by the computing system, one or more learned position embeddings for the one or more input images 12.

The computing system can process the one or more image embeddings 14 with a machine-learned encoder model 18 to generate a scene embedding 20 that represents the scene.

The computing system can obtain ray data 22 descriptive of one or more ray castings for a predicted image of the scene. As examples, the ray data 22 can include one or more sets of 5- or 6-D ray information that respectively correspond to one or more pixels in the predicted image.

The computing system can process the scene embedding 20 and the ray data 22 with a machine-learned decoder model 24 to generate synthesized image data for the one or more ray castings for the predicted image 26 of the scene. In some implementations, the synthesized image data for each ray casting can be or include color data for a pixel of the predicted image 26 that corresponds to the ray casting. The computing system can provide the predicted image 26 of the scene as an output.

In some implementations, one or both of the machine-learned encoder model 18 and the machine-learned decoder model 24 can be or include a self-attention model, such as, for example, a transformer model.

For example, in some implementations, the machine-learned decoder model 24 can include a self-attention model; and processing, by the computing system, the scene embedding 20 and the ray data 22 with the machine-learned decoder model 24 can includes: generating key and value data elements from the scene embedding 20; generating query data elements from the ray data 22; and processing, by the computing system, the key, value, and query data elements with the machine-learned decoder model 24 to generate the synthesized image data for the one or more ray castings.

In some implementations, the machine-learned encoder model 18 and the machine-learned decoder model 24 have been jointly trained using a shared loss function. In some implementations, at least the machine-learned encoder model 18 has been pre-trained using different images that depict a different scene.

In some implementations, during training, the computing system can evaluate a loss function that compares the synthesized image data for the one or more ray castings (e.g., included in the image 26) to ground truth image data for the one or more ray castings (e.g., included in a ground truth image of the scene that was not included in the input images 12). For example, the loss function can evaluate a distance, in color space, between a predicted color for each pixel and a ground truth color for the pixel.

During training, the computing system can modify one or more values of one or more parameters of the machine-learned decoder model 24 and/or the machine-learned encoder model 18 based at least in part on the loss function. For example, the loss function can be backpropagated through the decoder model 24 and then optionally also through the encoder model 18, and optionally the feature extraction model (e.g., CNN 16) as well.

Figure 2:
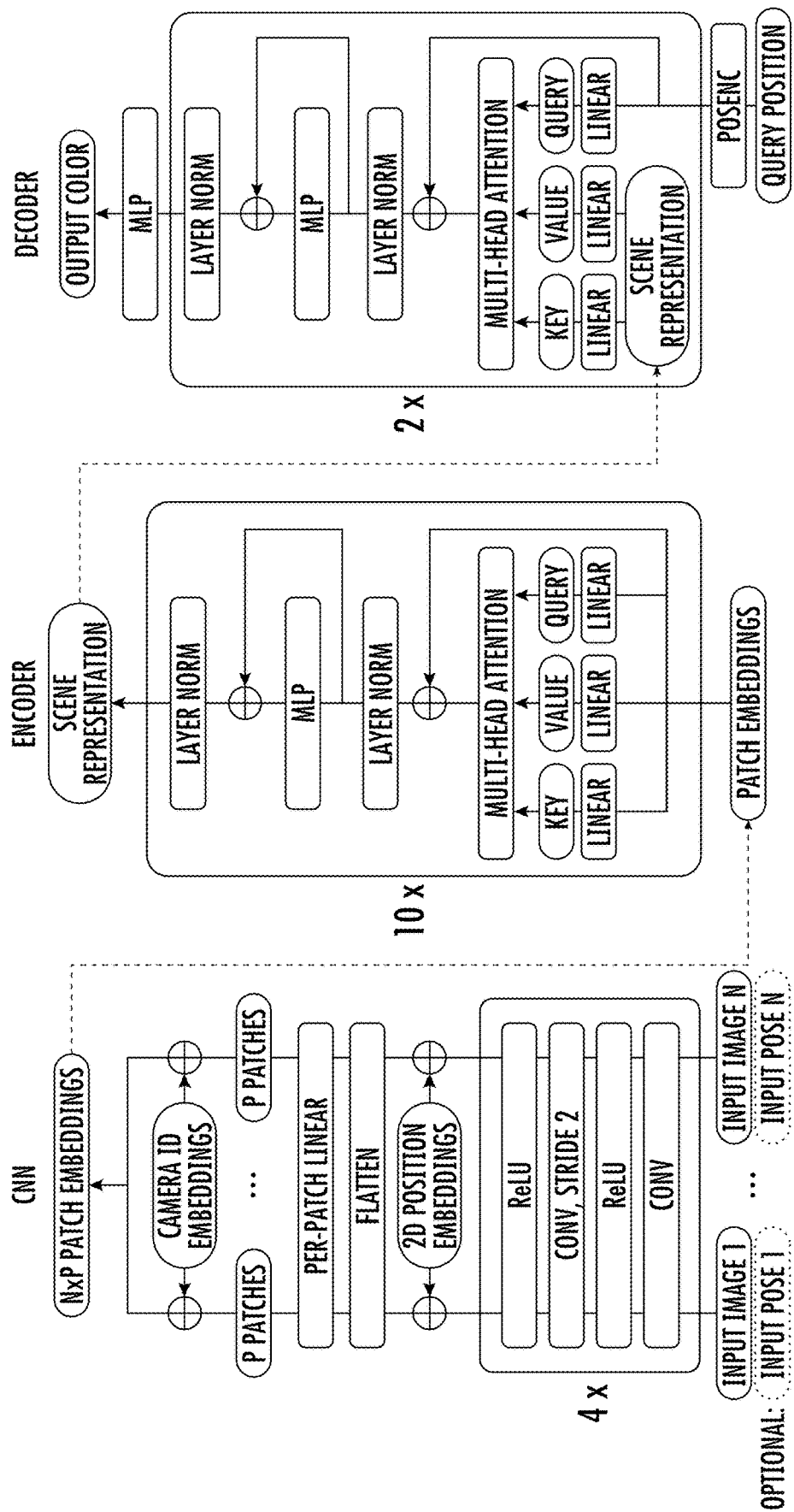
FIG. 2 depicts block diagrams of example machine-learned models according to example embodiments of the present disclosure.

FIG. 2 depicts block diagrams of example machine-learned models according to example embodiments of the present disclosure. In the example models shown in FIG. 2, given RGB inputs that are optionally posed, a CNN extracts patch features, onto which learned embeddings for 2D position and camera ID are added. A Transformer performs self-attention on the patch embeddings, leading to the Scene Representation. The decoder attends into the Scene Representation using a given 6D ray pose, leading to the final RGB output.

Figure 3A:
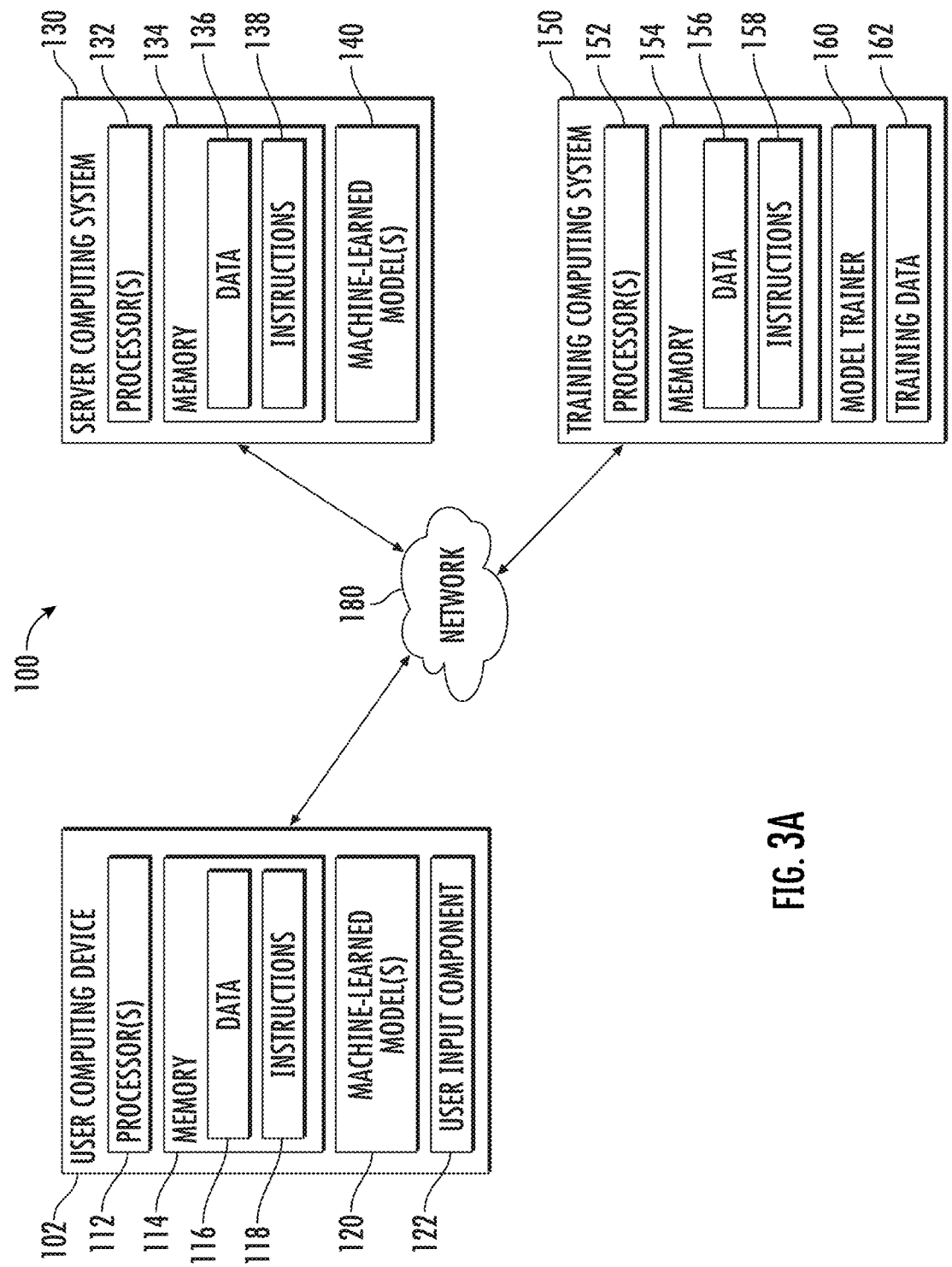
FIG. 3A depicts a block diagram of an example computing system according to example embodiments of the present disclosure.

FIG. 3A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel image synthesis or other image processing across multiple instances of image scenes).

Additionally or alternatively, one or more machine-learned models 140 (e.g., a machine-learned decoding model, etc.) can be included in or otherwise stored and implemented by the server computing system 130 that communicates with the user computing device 102 according to a client-server relationship. For example, the machine-learned models 140 can be implemented by the server computing system 140 as a portion of a web service (e.g., an image processing service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 3A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 3B:
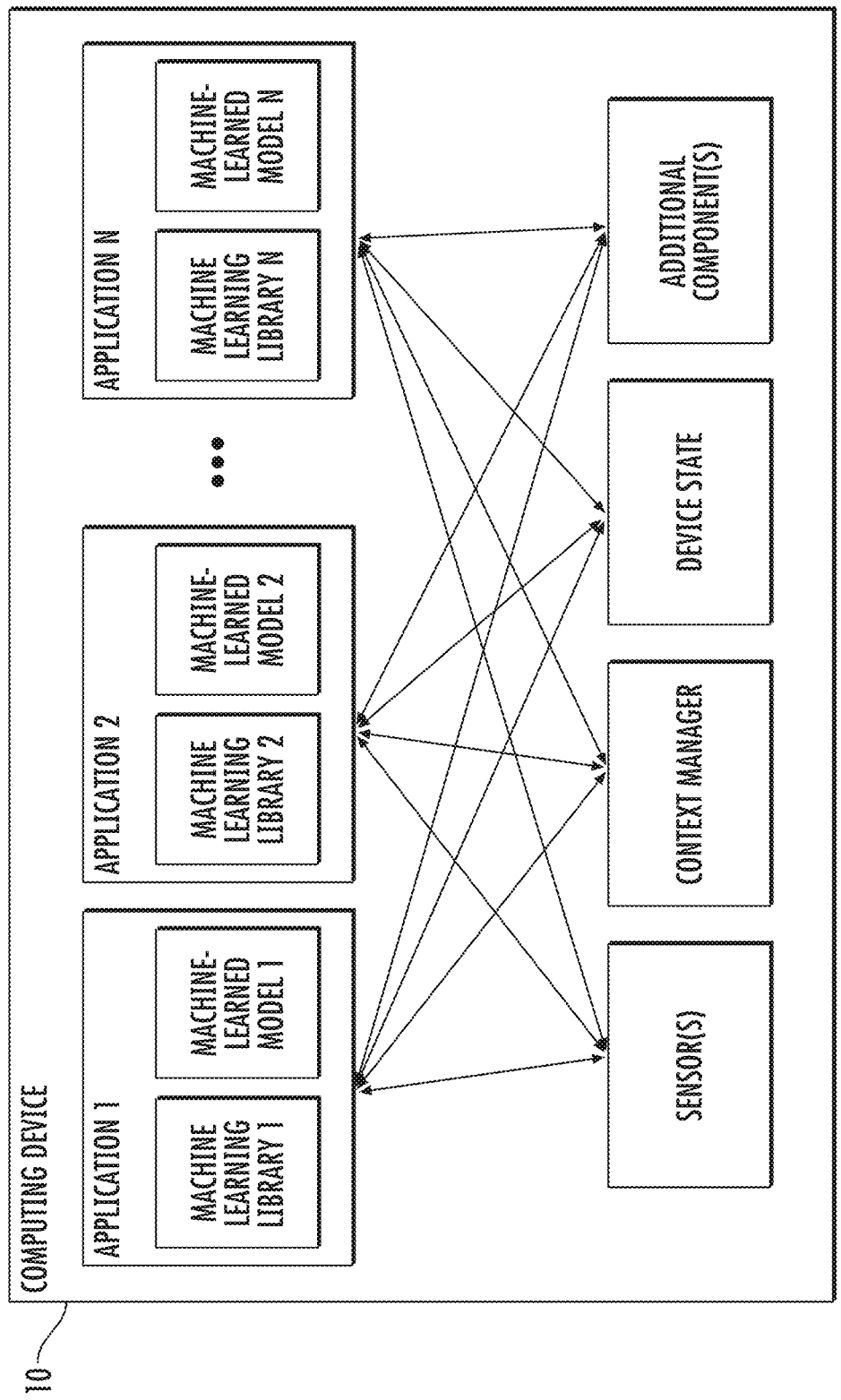
FIG. 3B depicts a block diagram of an example computing device according to example embodiments of the present disclosure.

FIG. 3B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3C:
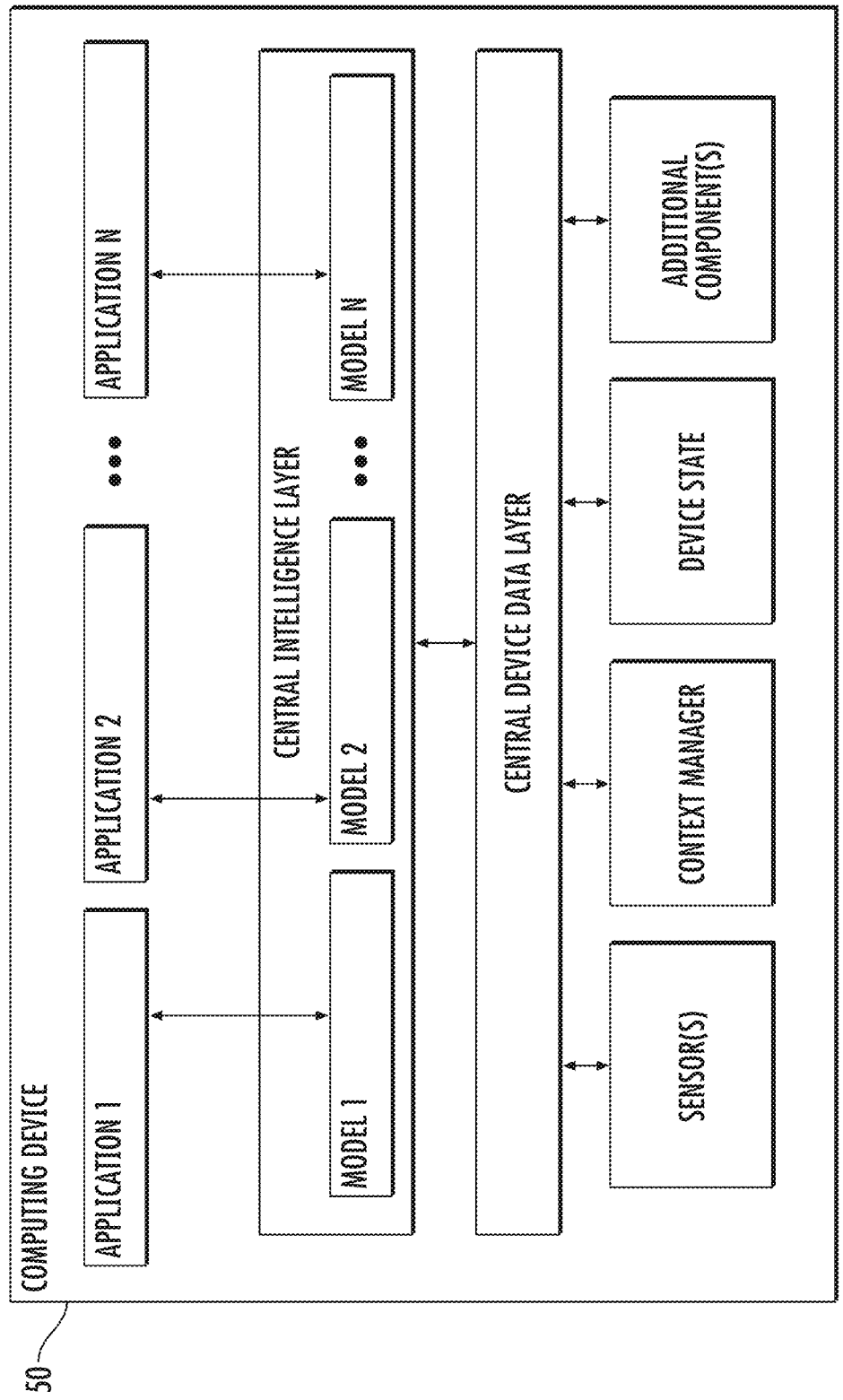
FIG. 3C depicts a block diagram of an example computing device according to example embodiments of the present disclosure.

FIG. 3C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 4:
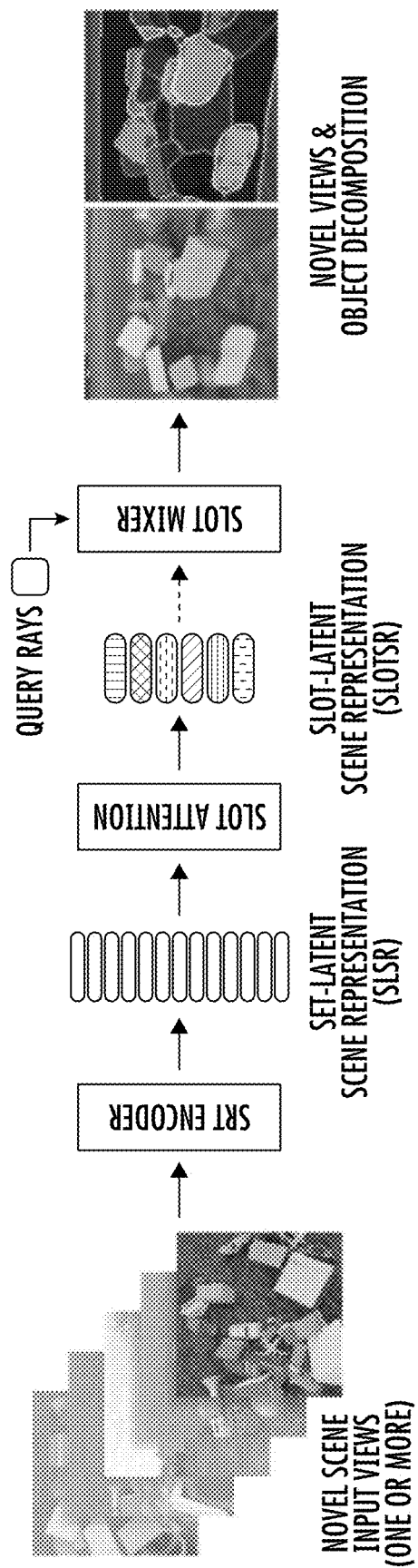
FIG. 4 illustrates a block diagram for an example model architecture according to some embodiments of the present disclosure.

FIG. 4 illustrates a block diagram for an example model architecture according to some embodiments of the present disclosure.

Figure 5:
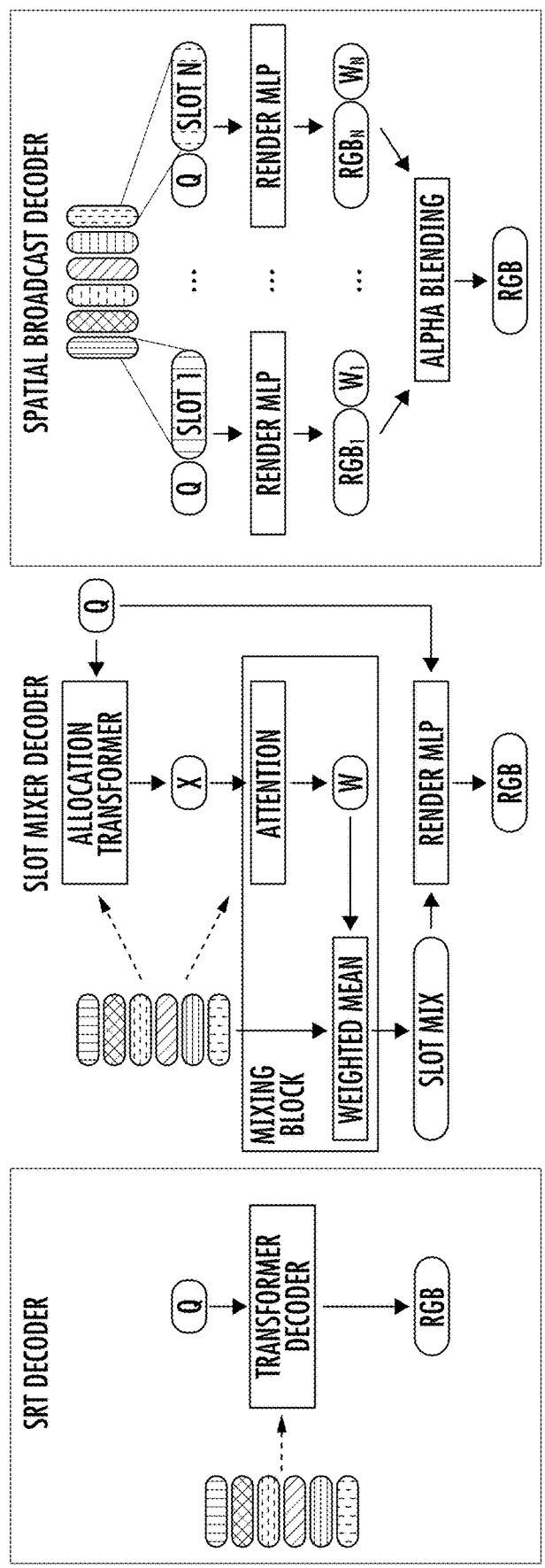
FIG. 5 is a block diagram that illustrates example decoder models.
Figure 6:
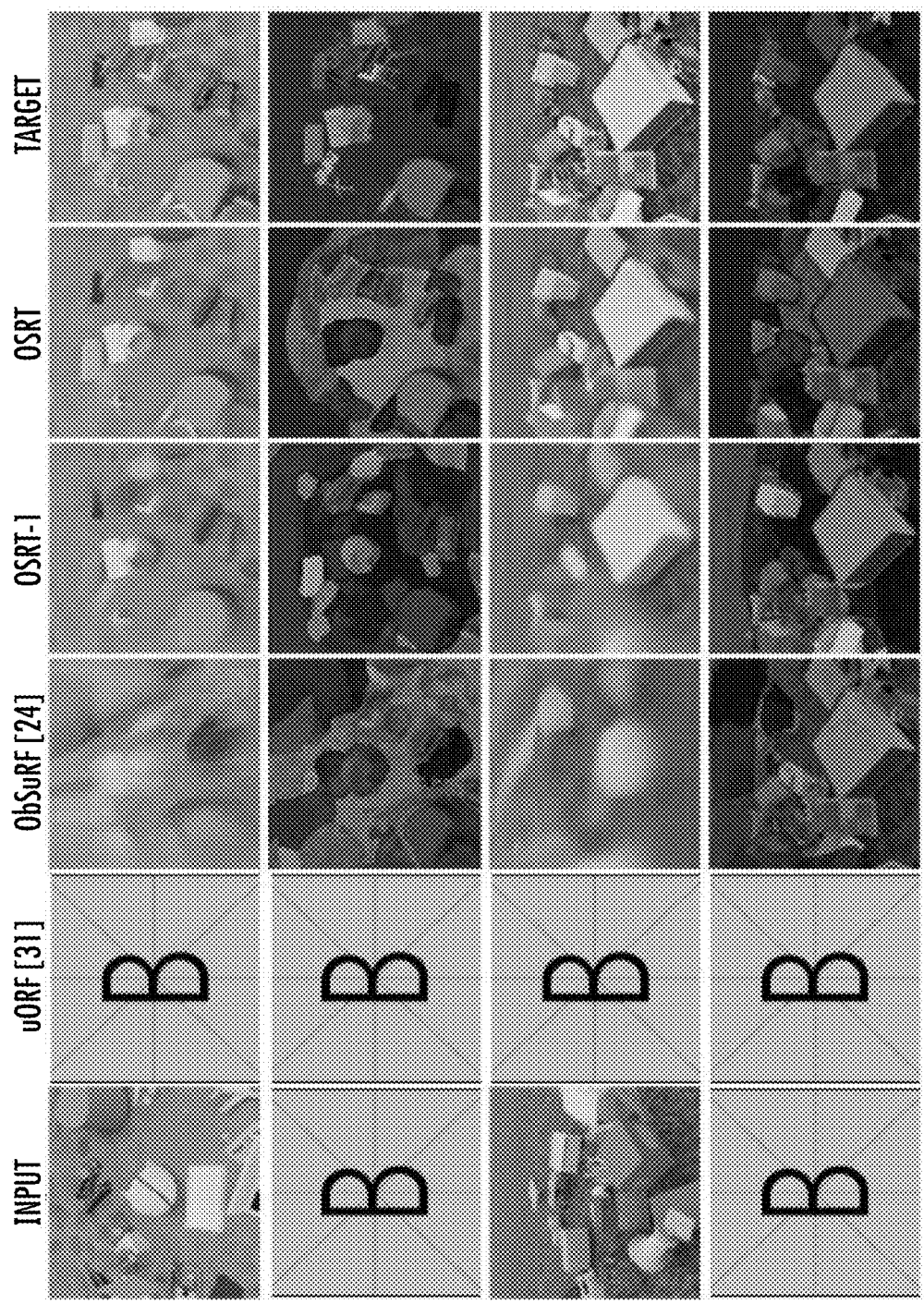
FIG. 6 illustrates example novel synthesis images synthesized according to some embodiments of the present disclosure.
Figure 7:
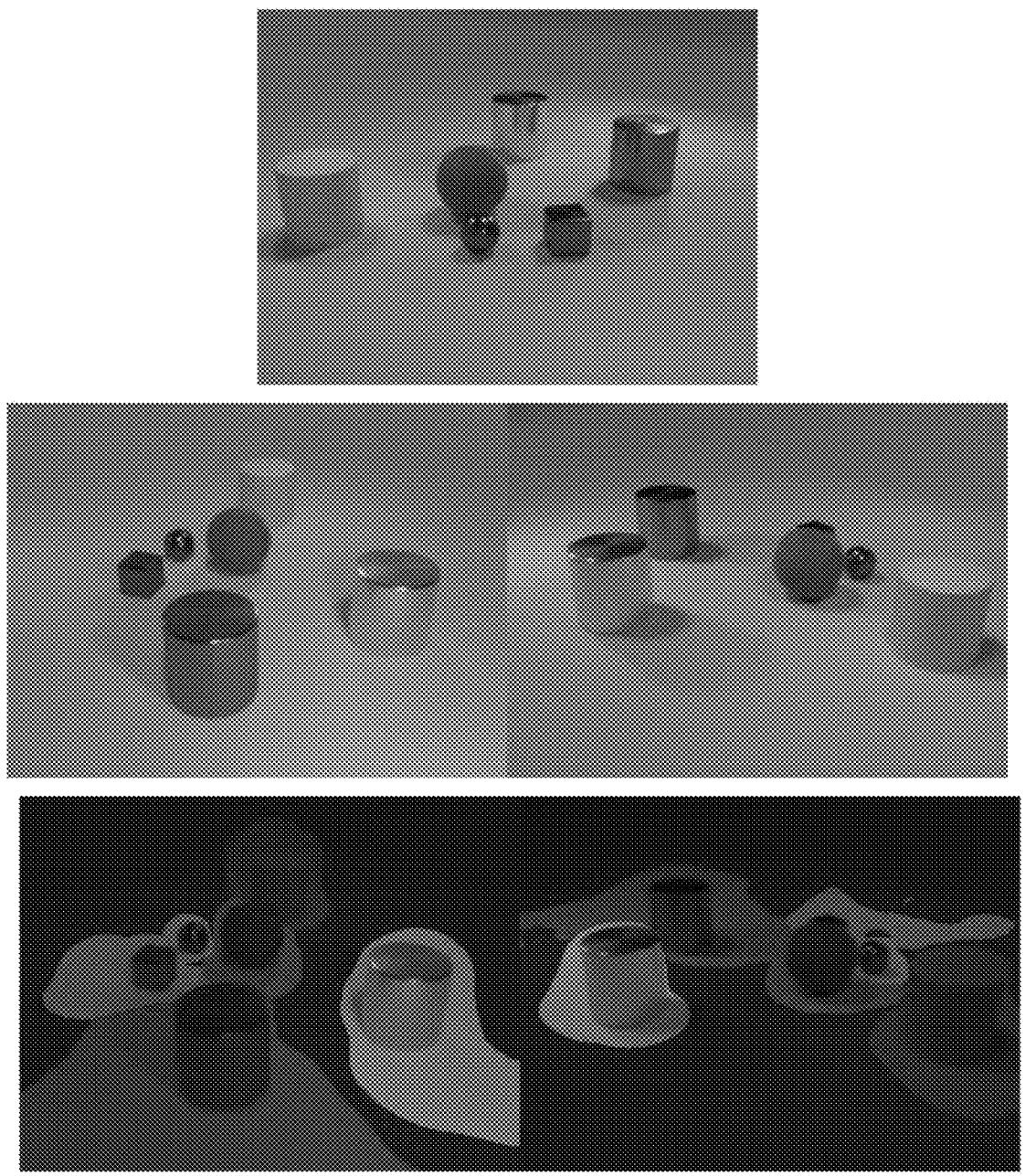
FIGS. 7 and 8 illustrate example intermediate object-aware outputs according to some embodiments of the present disclosure.
Figure 8:
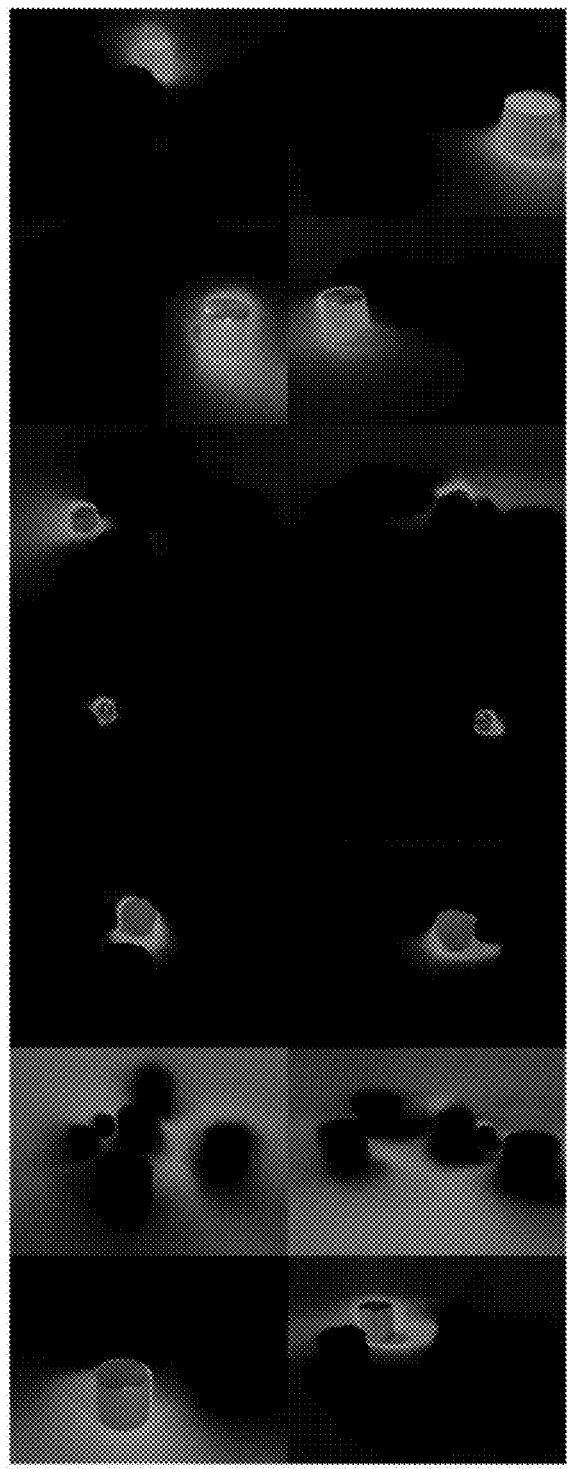

FIG. 5 is a block diagram that illustrates example decoder models;

FIG. 6 illustrates example novel synthesis images synthesized according to some embodiments of the present disclosure; and FIGS. 7 and 8 illustrate example intermediate object-aware outputs according to some embodiments of the present disclosure. It should be noted that the latent representation encodings do not just describe objects, but also portions of the background. That is in part because of shadows that the objects are casting on the background of the scene. For example, each ray can be used to determine a pixel the slot that had the highest weight in the Mixing Block (and each slot gets a different color for the visualization). For example, if 32 latent representation encodings are utilized, but there are not 32 objects in the scene, some of the latent representation encodings are often left unused, or some objects get split between latent representation encodings.

Figure 9:
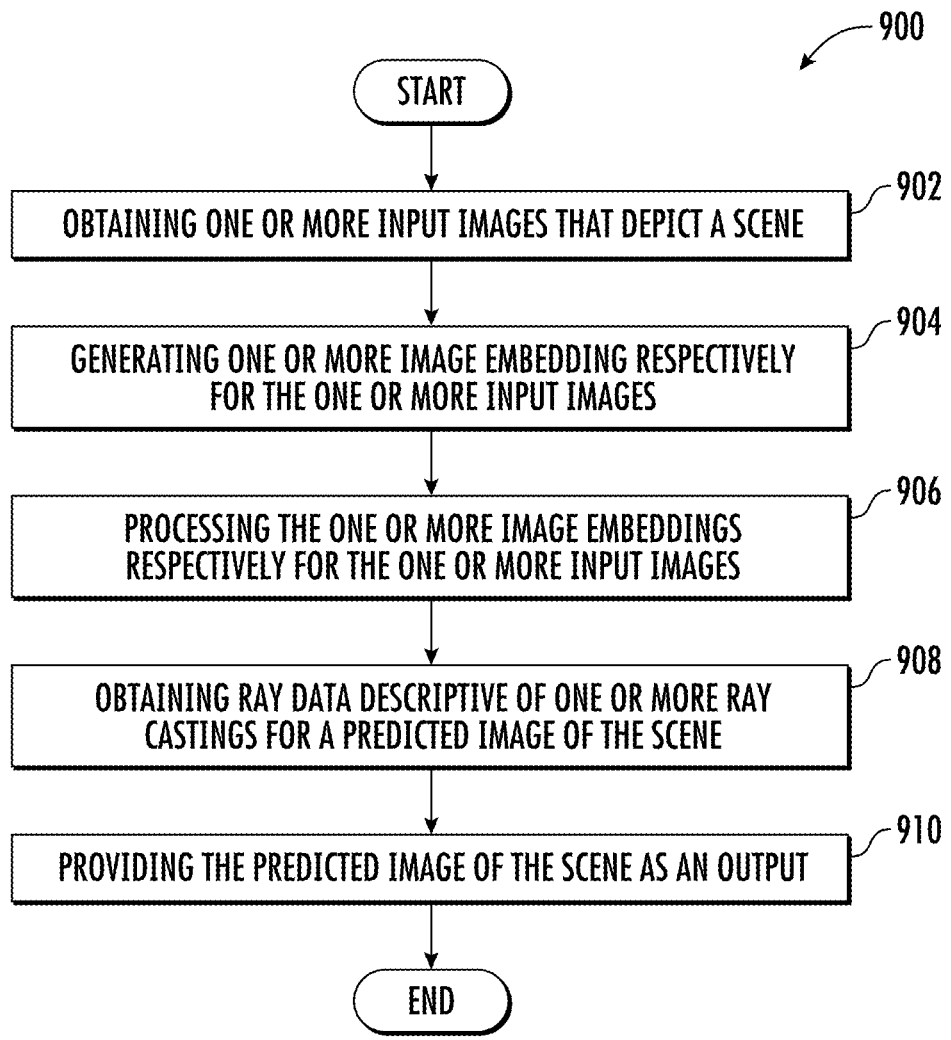
FIG. 9 depicts a flow chart diagram of an example method to perform geometry-free neural scene representations through novel-view synthesis according to example embodiments of the present disclosure.

FIG. 9 depicts a flow chart diagram of an example method to perform geometry-free neural scene representations through novel-view synthesis according to example embodiments of the present disclosure. FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system can obtain one or more input images that depict a scene.

At 904, the computing system can generate one or more image embeddings respectively for the one or more input images.

At 906, the computing system can process the one or more image embeddings respectively for the one or more input images.

At 908, the computing system can obtain ray data descriptive of one or more ray castings for a predicted image of the scene.

At 910, the computing system provide the predicted image of the scene as an output.

Figure 10:
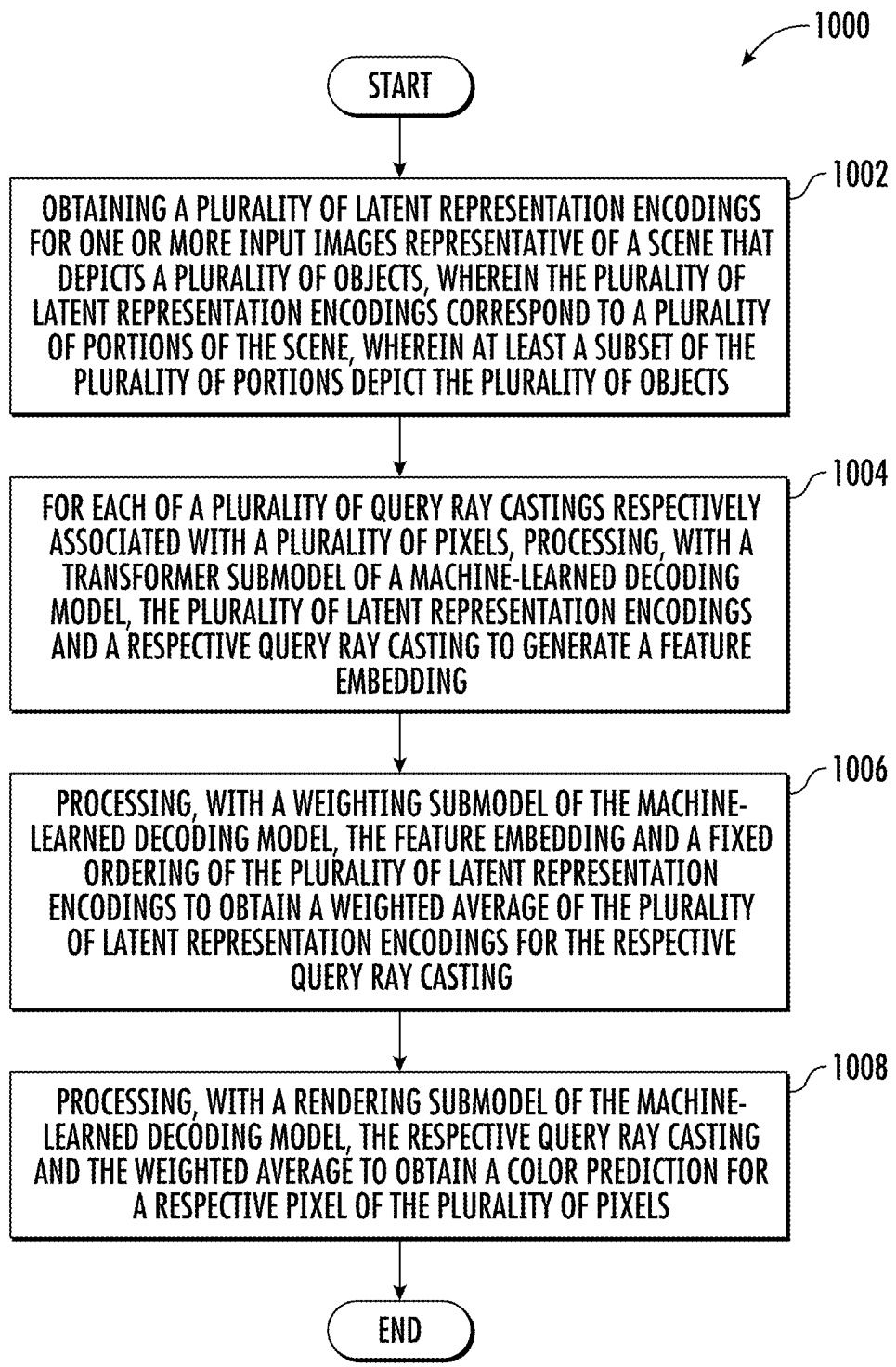
FIG. 10 depicts a flow chart diagram of an example method to perform object-centric novel view synthesis according to example embodiments of the present disclosure.

FIG. 10 depicts a flow chart diagram of an example method to perform object-centric novel view synthesis according to example embodiments of the present disclosure. FIG. 10 depicts a flow chart diagram of an example method to perform according to example embodiments of the present disclosure. Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, a computing system can obtain a plurality of latent representation encodings for one or more input images representative of a scene that depicts a plurality of objects, wherein the plurality of latent representation encodings correspond to a plurality of portions of the scene, wherein at least a subset of the plurality of portions depict the plurality of objects.

At 1004, the computing system can, for each of a plurality of query ray castings respectively associated with a plurality of pixels, process, with a transformer submodel of a machine-learned decoding model, the plurality of latent representation encodings and a respective query ray casting to generate a feature embedding.

At 1006, the computing system can, for each of a plurality of query ray castings respectively associated with a plurality of pixels, process, with a weighting submodel of the machine-learned decoding model, the feature embedding and a fixed ordering of the plurality of latent representation encodings to obtain a weighted average of the plurality of latent representation encodings for the respective query ray casting.

At 1008, the computing system can, for each of a plurality of query ray castings respectively associated with a plurality of pixels, process, with a rendering submodel of the machine-learned decoding model, the respective query ray casting and the weighted average to obtain a color prediction for a respective pixel of the plurality of pixels.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to generate novel views of scenes more efficiently, the method comprising:

obtaining, by a computing system comprising one or more computing devices, one or more input images that depict a scene;

generating, by the computing system, one or more image embeddings respectively for the one or more input images;

processing, by the computing system, the one or more image embeddings with a machine-learned encoder model to generate a scene embedding that represents the scene;

obtaining, by the computing system, ray data descriptive of one or more ray castings for a predicted image of the scene;

processing, by the computing system, the scene embedding and the ray data with a machine-learned decoder model to generate synthesized image data for the one or more ray castings for the predicted image of the scene, wherein the machine-learned decoder model comprises a self-attention model, and wherein processing the scene embedding and the ray data with the machine-learned decoder model comprises:

generating key and value data elements from the scene embedding;

generating query data elements from the ray data; and processing the key, value, and query data elements with the machine-learned decoder model to generate the synthesized image data for the one or more ray castings for the predicted image of the scene; and providing, by the computing system, the predicted image of the scene as an output.

2. The computer-implemented method of claim 1, wherein the machine-learned encoder model comprises a self-attention model.

3. The computer-implemented method of claim 1, wherein the machine-learned encoder model and the machine-learned decoder model have been jointly trained using a shared loss function.

4. The computer-implemented method of claim 1, wherein at least the machine-learned encoder model has been pre-trained using different images that depict a different scene.

5. The computer-implemented method of claim 1, wherein generating, by the computing system, the one or more image embeddings respectively for the one or more input images comprises processing, by the computing system, the one or more input images with a convolutional neural network to respectively generate the one or more image embeddings.

6. The computer-implemented method of claim 1, wherein generating, by the computing system, the one or more image embeddings respectively for the one or more input images comprises generating, by the computing system, one or more learned position embeddings for the one or more input images.

7. The computer-implemented method of claim 1, wherein the synthesized image data for each ray casting comprises color data for a pixel of the predicted image that corresponds to the ray casting.

8. The computer-implemented method of claim 1, wherein the one or more input images comprises a plurality of input images respectively captured at a plurality of different poses relative to the scene.

9. The computer-implemented method of claim 1, wherein the one or more input images comprise unposed images that have an unspecified pose relative to the scene.

10. The computer-implemented method of claim 1, further comprising:

evaluating, by the computing system, a loss function that compares the synthesized image data for the one or more ray castings to ground truth image data for the one or more ray castings; and modifying, by the computing system, one or more values of one or more parameters of the machine-learned decoder model based at least in part on the loss function.

11. The computer-implemented method of claim 1, further comprising:

evaluating, by the computing system, a loss function that compares the synthesized image data for the one or more ray castings to ground truth image data for the one or more ray castings; and modifying, by the computing system, one or more values of one or more parameters of both the machine-learned decoder model and the machine-learned encoder model based at least in part on the loss function.

12. A computing system for generating scene-specific predicted imagery more efficiently, the computing system comprising:

one or more processors; and one or more non-transitory computer-readable media that collectively store instructions that, when executed by the one or more processors, cause the computing system to perform operations, the operations comprising:

obtaining a scene embedding generated by a machine-learned encoder model from one or more images of a scene, wherein the scene embedding represents the scene;

obtaining ray data descriptive of one or more ray castings for a predicted image of the scene;

processing the scene embedding and the ray data with a machine-learned decoder model to generate synthesized image data for the one or more ray castings for the predicted image of the scene, wherein the machine-learned decoder model comprises a self-attention model, and wherein processing the scene embedding and the ray data with the machine-learned decoder model comprises:

generating key and value data elements from the scene embedding;

generating query data elements from the ray data; and processing the key, value, and query data elements with the machine-learned decoder model to generate the synthesized image data for the one or more ray castings for the predicted image of the scene; and providing the predicted image of the scene as an output.

13. The computing system of claim 12, wherein machine-learned encoder model comprises a self-attention model.

14. The computing system of claim 12, wherein the machine-learned encoder model and the machine-learned decoder model have been jointly trained using a shared loss function.

15. The computing system of claim 12, wherein at least the machine-learned encoder model has been pre-trained using different images that depict a different scene.

16. One or more non-transitory computer-readable media that store instructions that, when executed by a computing system, cause the computing system to perform operations, the operations comprising:

obtaining one or more input images that depict a scene;

generating one or more image embeddings respectively for the one or more input images;

processing the one or more image embeddings with a machine-learned encoder model to generate a scene embedding that represents the scene;

obtaining ray data descriptive of one or more ray castings for a predicted image of the scene;

processing the scene embedding and the ray data with a machine-learned decoder model to generate synthesized image data for the one or more ray castings for the predicted image of the scene, wherein the machine-learned decoder model comprises a self-attention model, and wherein processing the scene embedding and the ray data with the machine-learned decoder model comprises:

generating key and value data elements from the scene embedding;

generating query data elements from the ray data; and processing the key, value, and query data elements with the machine-learned decoder model to generate the synthesized image data for the one or more ray castings for the predicted image of the scene;

evaluating a shared loss function that compares the synthesized image data for the one or more ray castings to ground truth image data for the one or more ray castings; and modifying one or more values of one or more parameters of the machine-learned decoder model based at least in part on the loss function.

17. The one or more non-transitory computer-readable of claim 16, wherein the operations further comprise modifying one or more values of one or more parameters of the machine-learned encoder model based at least in part on the loss function.

18. The one or more non-transitory computer-readable of claim 16, wherein the machine-learned encoder model comprises a self-attention model.

19. The one or more non-transitory computer-readable of claim 16, wherein at least the machine-learned encoder model has been pre-trained using different images that depict a different scene.

* * * * *